(12) United States Patent
Holverson et al.

(10) Patent No.: US 7,002,103 B2
(45) Date of Patent: *Feb. 21, 2006

(54) WELDING-TYPE POWER SUPPLY WITH A STATE-BASED CONTROLLER

(75) Inventors: Todd Holverson, Appleton, WI (US); Robert Davidson, New London, WI (US); James Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/841,305

(22) Filed: May 7, 2004

(65) Prior Publication Data

US 2004/0206737 A1    Oct. 21, 2004

Related U.S. Application Data

(63) Continuation of application No. 09/956,548, filed on Sep. 19, 2001, now Pat. No. 6,747,247.

(51) Int. Cl.
*B23K 9/10*    (2006.01)

(52) U.S. Cl. .................................. 219/130.5
(58) Field of Classification Search ............ 219/130.5, 219/124.34, 125.1, 130.21; 228/104; 700/245; 706/47; 901/42
See application file for complete search history.

(56) References Cited

U.S. PATENT DOCUMENTS

| | | | |
|---|---|---|---|
| 5,278,390 A | | 1/1994 | Blankenship |
| 5,367,138 A | * | 11/1994 | Moss et al. ................ 219/109 |
| 5,963,022 A | * | 10/1999 | Buda et al. ................ 323/212 |
| 6,115,273 A | | 9/2000 | Geissler |
| 6,169,263 B1 | * | 1/2001 | Derby, Jr. et al. ......... 219/86.41 |
| 6,278,074 B1 | | 8/2001 | Morlock et al. |
| 6,292,715 B1 | | 9/2001 | Rongo |
| 6,583,386 B1 | * | 6/2003 | Ivkovich ................ 219/130.01 |
| 6,747,247 B1 | * | 6/2004 | Holverson et al. ........ 219/130.5 |
| 6,849,828 B1 | * | 2/2005 | Aigner ................ 219/130.21 |
| 2002/0107825 A1 | | 8/2002 | Manicke et al. |
| 2002/0117487 A1 | | 8/2002 | Corby, Jr. et al. |
| 2004/0010342 A1 | * | 1/2004 | Thelen ................. 700/245 |

FOREIGN PATENT DOCUMENTS

WO    WO 01/53030 A1 *    7/2001

OTHER PUBLICATIONS

Liu et al., "Machine Control Software Design", IEEE, 1986, pp. 1761-1765.*
ALT 304 Miller® The Power of Blue Oct. 2000.
Maxstar 200 SD, DX, And LX Miller® The Power of Blue Dec. 2000.

* cited by examiner

*Primary Examiner*—Clifford C. Shaw
(74) *Attorney, Agent, or Firm*—George R. Corrigan (57) ABSTRACT

A method and apparatus for providing welding-type power includes a source of welding-type power and a controller. The controller is a state-based controller, and/or a deterministic control module, connected to the controller output. The state-based control module includes, in an embodiment, software instructions and a digital processor, and/or a state transition table stored in a spreadsheet data base. The controller is responsive to a feedback circuit. One or more welding peripherals, such as a wire feeder or robot, are connected to the controller. The current state may be represented by data in a first line of a spreadsheet and a state-ending event by a second, perpendicular, line of a spreadsheet. The subsequent state is determined by the intersection of the first and second lines in another embodiment.

15 Claims, 7 Drawing Sheets

FIG. 1

PRODUCTION PULSE:

| Present Phase | Arc next phase | Short next phase | Short detect Threshold | Arc detect Threshold | Amps Out | Time to next phase |
|---|---|---|---|---|---|---|
| Peak | Back | Clear Ramp | Vpeak x .5 | Vpeak | Apeak | Peakt |
| Back | Peak | Wett | Vback x .5 | Vback | Aback | Backt |

FIG. 2A

ACMIG 1:

| Present Phase | Arc next phase | Short next phase | Short detect Threshold | Arc detect Threshold | Amps Out | Time to next phase |
|---|---|---|---|---|---|---|
| Peak | Back1 | Clear Ramp | Vpeak x .5 | Vpeak | Apeak | Peakt |
| Back1 | Neg Peak | Wett | Vback1 x .5 | Vback1 | Aback1 | Back1t |
| Neg Peak | Back2 | Neg Clear Ramp | VNpeak x .5 | VNpeak | ANegPeak | NegPeakt |
| Back2 | Peak | Wett | Vback2 x .5 | Vback2 | Aback2 | Back2t |

FIG. 2B

ACMIG 2:

| Present Phase | Arc next phase | Short next phase | Short detect Threshold | Arc detect Threshold | Amps Out | Time to next phase |
|---|---|---|---|---|---|---|
| Peak | NegBack1 | Clear Ramp | Vpeak x .5 | Vpeak | Apeak | Peakt |
| Neg Back1 | Neg Peak | Wett | VNback1 x .5 | VNback1 | ANegback1 | Negback1t |
| Neg Peak | Neg Back2 | Neg Clear Ramp | VNpeak x .5 | VNPeak | ANegpeak | NegPeakt |
| Neg Back2 | Peak | Wett | VNback2 x .5 | VNback2 | ANegback2 | NegBack2t |

FIG. 2C

ACMIG 3:

| Present Phase | Arc next phase | Short next phase | Short detect Threshold | Arc detect Threshold | Amps Out | Time to next phase |
|---|---|---|---|---|---|---|
| Peak | Neg Back | Clear Ramp | Vpeak x .5 | Vpeak | Apeak | Peakt |
| Neg Back | Neg Peak | Wett | VNback x .5 | VNback | Anegback | NegBackt |
| Neg Peak | Back | Neg Clear Ramp | VNpeak x .5 | VNback | ANegpeak | NegPeakt |
| Back | Peak | Wett | Vback x .5 | Vback | Abackt | Backt |

FIG. 2D

ACMIG 4:

| Present Phase | Arc next phase | Short next phase | Short detect Threshold | Arc detect Threshold | Amps Out | Time to next phase |
|---|---|---|---|---|---|---|
| Peak | Back | Clear Ramp | Vpeak x .5 | Vpeak | Apeak | Peakt |
| Back | Neg Peak | Wett | Vback x .5 | Vback | Aback | Backt |
| Neg Peak | Neg Back | Neg Clear Ramp | VNpeak x .5 | VNback | ANegpeak | NegPeakt |
| Neg Back | Peak | Wett | VNback x .5 | VNback | Anegback | NegBackt |

FIG. 2E

| STATE | Timeout | Cont | TrgOn | TrgOff | Varc | Narc | Jog | JgF | Jg- | Jg-F | Pur | PrF | TS | TsF | Stk | Err1 | Err2 | W1 | Fclr |
|---|---|---|---|---|---|---|---|---|---|---|---|---|---|---|---|---|---|---|---|
| Standby | x | | Prflw | NC | Err | nc | Jog | nc | | | Pur | nc | TS | nc | | | | | |
| Preflow | Runin | 1 | nc | StdBy | Err | nc | nc | nc | | | nc | nc | TS | nc | | | | | |
| Runin | Baby Arc | 1 | nc | StdBy | BbyA | nc | nc | nc | | | nc | nc | x | nc | | | | | |
| Baby Arc | StPwRp | 1 | nc | SAStp | nc | Runin | nc | nc | | | nc | nc | x | nc | | | | | |
| StPwrRmp | StrtPwr | 0 | nc | CrtrR | nc | Runin | nc | nc | | | nc | nc | x | nc | | | | | |
| StartPower | WldRmp | 0 | nc | CrtrR | nc | nc | nc | nc | | | nc | nc | x | nc | | | | | |
| Weld Rmp | Weld | 0 | nc | CrtrR | nc | nc | nc | nc | | | nc | nc | x | nc | | | | | |
| Weld | CrtrRmp | 1 | nc | CrtrR | nc | nc | nc | nc | | | nc | nc | x | nc | | | | | |

FIG. 3A1

| STATE | Timeout | Cont | TrgOn | TrgOff | Varc | Narc | Jog | JgF | Jg- | Jg-F | Pur | PrF | TS | TsF | Stk | Err1 | Err2 | W1 | Eclr |
|---|---|---|---|---|---|---|---|---|---|---|---|---|---|---|---|---|---|---|---|
| CraterRmp | Crater | 0 | WldR | Crter | nc | nc | nc | nc | | | nc | nc | x | nc | | | | | |
| Crater | ShtArStp | 0 | WldR | nc | nc | nc | nc | nc | | | nc | nc | x | nc | | | | | |
| ShrtArStp | StkChk | 0 | Runin | nc | nc | nc | nc | nc | | | nc | nc | x | nc | | | | | |
| StickCheck | Retract | 1 | Prflw | nc | ?? | nc | nc | nc | | | nc | nc | x | nc | | | | | |
| Retract | Postflow | 0 | Prflw | nc | Err | nc | nc | nc | | | nc | nc | x | nc | | | | | |
| Postflow | Stndby | 0 | PrFlw | nc | Err | nc | nc | nc | | | nc | nc | TS | nc | | | | | |
| Weld Done | Stndby | 1 | Prflw | nc | Err | nc | nc | nc | | | nc | SB | TS | nc | | | | | |
| Jog | Stndby | 0 | ?? | nc | Err | nc | Jog | SB | | | nc | nc | TS | nc | | | | | |
| Purge | Stndby | 0 | ?? | nc | Err | nc | nc | nc | | | Pur | nc | TS | nc | | | | | |

FIG. 3A2

| STATE | Timeout | Cont | TrgOn | TrgOff | Varc | Narc | Jog | JgF | Jg- | Jg-F | Pur | PrF | TS | TsF | Stk | Err1 | Err2 | W1 | Eclr |
|---|---|---|---|---|---|---|---|---|---|---|---|---|---|---|---|---|---|---|---|
| TeachMode | Stndby | 1 | | | nc | nc | nc | nc | | | nc | nc | ?? | nc | | | | | |
| Test | Stndby | 1 | | | ?? | nc | nc | nc | | | nc | nc | ?? | nc | | | | | |
| TouchSnse | Stndby | 1 | | | nc | nc | nc | nc | | | nc | nc | NC | SB | | | | | |
| Error | Stndby | 1 | | | nc | nc | nc | nc | | | nc | nc | nc | nc | | | | | |
| AlStpCol1 | AlStpHt1 | 0 | Prflw | nc | nc | nc | nc | nc | | | nc | nc | nc | nc | | | | | |
| AlStpHot1 | AlStpCl2 | 0 | Prflw | nc | nc | nc | nc | nc | | | nc | nc | nc | nc | | | | | |
| AlStpCol2 | AlStpHt2 | 0 | Prflw | nc | nc | nc | nc | nc | | | nc | nc | nc | nc | | | | | |
| AlStpHot2 | ShrtAStp | 0 | Prflw | nc | nc | nc | nc | nc | | | nc | nc | nc | nc | | | | | |

FIG. 3A3

| VOLTS | WFS | TIME | ENBLE | PRG# | SPD | IND | /ARC | DvR | GAS | ARC | MOTN | VOLTS | WFS | STUK | OUT A | OUT B | A1 | A2 | DAC BITS | NEW | NEW |
|---|---|---|---|---|---|---|---|---|---|---|---|---|---|---|---|---|---|---|---|---|---|
| x | ### | 0 | Con | ## | x | 0 | | 0 | 0 | 0x | | x | | 0 | | | | | | | 1 |
| x | ### | 0 | | ## | | 0 | | 0 | 1 | 0x | | x | | 0 | | | | | | | |
| ### | ### | | Set | x | | 0?? | 0?? | | 1 | 0 | | 0### | ### | | ### | ### | | | | | |
| ### | ### | | Set | x | | 0?? | 0?? | | 1 | 1 | | 0### | ### | | ### | ### | | | | | |
| ### | ### | | Set | ## | | 0### | 0### | | 1 | 1 | | 0### | ### | | ### | ### | | | | | |
| ### | ### | | | ## | ## | 0### | 0### | | 1 | 1 | | 0### | ### | | ### | ### | | | | | |
| ### | ### | 0 | | ## | ## | | ### | | 1 | 1x | | ### | ### | | ### | ### | | | | | |
| ### | ### | 0 | Con | ## | | | ### | | 1 | 1x | | ### | ### | | ### | ### | | | | | |

FIG. 3B1

| VOLTS | WFS | TIME | ENBLE | PRG# | SPD | IND | /ARC | DvR | GAS | ARC | MOTN | VOLTS | WFS | STUK | OUT A | OUT B | A1 | A2 | DAC BITS | NEW | NEW |
|---|---|---|---|---|---|---|---|---|---|---|---|---|---|---|---|---|---|---|---|---|---|
| ### | ### | 0 | | ## | x | 0### | 0### | | 1 | 1x | | ### | ### | | ### | ### | | | | | |
| ### | ### | 0 | | ## | x | 0### | 0### | | 1 | 1x | | ### | ### | | ### | ### | | | | | |
| x | x | | Set | x | x | 0x | | | 1 | 1 | | 0x | x | | ### | ### | | | | | |
| ?? | ?? | | ?? | x | x | 0?? | | | ? | 0 | | 0?? | ?? | | ### | ### | | | | | |
| 0?? | 0?? | | ?? | x | x | | | 0 | 1 | 0x | | x | | 0 | ### | ### | | | | | |
| x | x | 0 | x | x | x | | | 0 | 0 | 0x | | 0 | 0 | 0 | ### | ### | | | | | |
| 0ACCEL | 0ACCEL | 3min | | x | x | | | 0 | 0 | 0x | | 0 | 0ACCEL | | ### | ### | | | | | |
| 0 | 0 | 3min | | x | x | | | 0 | 1 | 0x | | 0 | 0 | 0 | ### | ### | | | | | |

WELDING-TYPE POWER SUPPLY WITH A STATE-BASED CONTROLLER

RELATED APPLICATIONS

This is a continuation of, and claims the benefit of the filing date of, U.S. patent application Ser. No. 09/956,548, filed on Sep. 19, 2001 now U.S. Pat. No. 6,747,247.

FIELD OF THE INVENTION

The present invention relates generally to the art of welding-type power supplies. More specifically, it relates to the control of welding-type power supplies.

BACKGROUND OF THE INVENTION

Welding power supplies or systems are available for a wide variety of processes, and with a wide variety of sophistication. Welding-type power supply or system, as used herein, includes power supplies or systems that provide welding, cutting or heating power, and may include a controller, switches, etc. Traditionally, a good weld required an experienced welder, not only to properly execute the weld, but to properly select operating parameters (such as output voltage, current, power, pulse width, wire feed speed, etc.)

Now, robots are available that execute the weld. Also, operating parameters may be pre-determined and automatically implemented by a controller in the welding-type power supply. The automation is typically a software program that describes the output waveform, and is executed by a digital processor (microprocessors, DSPs, etc.). The program attempts to implement and improve upon the decisions that had been made by the experienced welder.

The programs and waveforms are "hard-coded", where a computer program includes typical control loops and procedures, such as "if-then, "go-to", etc. For example, a decision would be on the order of: "if the pulse phase has timed out and we are not in a short circuit and the trigger is still pulled then go to the background phase" (written, of course, in a computer language such as "C").

While how to write such a program is well known, it can be very difficult to modify such a program. Modification requires a review of each line of code, which is then carefully modified to give the desired result. Modification can, of course, cause unexpected consequences or require re-writing of entire sections. Such changes may be extremely time consuming, requires the person doing the modification to understand the software language and understand the particular interaction of all the hard coded lines in the system. Also, with each change, software bugs may be introduced and the program can require extensive troubleshooting.

Welding automation is becoming increasingly sophisticated. This requires increasingly sophisticated control software, which only exacerbates the difficulty in updating or modifying a welding program. For example, a weld process might include peak amps, background amps, and a first ramp for the transition from background to peak. As the process control becomes more sophisticated, a second ramp from peak to background might be added, or the first ramp might be broken into two section with different slopes. It requires a substantial re-writing of the hard code to include these waveform segments. Then, if additional changes are made later, the code must be written again. Each addition to the code can lengthen the code, and make subsequent changes even more difficult.

Accordingly, a method and apparatus for controlling a welding-type power supply that allows for changing the waveform without requiring a lengthy and difficult re-writing of a program is desirable.

SUMMARY OF THE PRESENT INVENTION

According to a first aspect of the invention a welding-type system includes a source of welding-type power and a controller. The controller has an output operatively connected to the source. The controller also includes a state-based control module, and/or a deterministic control module, connected to the controller output.

According to a second aspect of the invention a method of providing a welding-type output includes providing a source of welding-type power and controlling the source using a state-based control scheme.

The state-based control module includes software instructions and a digital processor, and/or includes a state transition table stored in a spreadsheet data base, where a subsequent state and a current state are represented by data from the spreadsheet in various embodiments.

A feedback circuit is connected to the source and the controller and the state-based control module is responsive to the feedback circuit in another embodiment.

One or more welding peripherals, such as a wire feeder or robot, are operatively connected to the controller output in other embodiments.

The current state is represented by data in a first line of a spreadsheet and a state-ending event is indicated by a second, perpendicular, line of a spreadsheet, and the subsequent state is determined by the intersection of the first and second lines in another embodiment.

The data includes addressing data and/or parameter data in other embodiments.

According to a third aspect of the invention a method of controlling a welding-type system that operates in a plurality of states includes determining the present state of the system and determining at least one condition in which it is desired to end the state. The system is monitored for the existence of the at least one condition and a subsequent state to enter is selected from the plurality of states if the at least one condition exists. The selection is responsive to the at least one condition.

The at least one condition is a plurality of conditions, and the selecting is responsive to which of the plurality is met, and in order of first occurrence followed by priority, in an alternative.

The present state of the system includes correlating to a first set of data in a database, and/or determining at least one condition in which it is desired to end the state includes retrieving data from the first set of data, and/or selecting includes accessing a subset of the set of data in various alternatives.

The existence of the at least one condition includes monitoring at least one of timeouts and feedback in another embodiment.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system and controller it should be understood at the outset that the invention may also be implemented with other systems and controls, used in other applications, and used with other data.

Generally, the invention relates to controlling a welding-type system using a state-based controller. The controller includes a state-based control module that has a state transition table stored in a spreadsheet database, preferably in non-volatile memory.

Controller, as used herein, includes digital and analog circuitry, discrete or integrated circuitry, microprocessors, DSPs, etc., and software, hardware and firmware, located on one or more boards, used to control a device such as a power supply or power source. State transition table, as used herein, includes a table showing subsequent states in view of the current state and the conditions that lead to the subsequent states. State-based control module, as used herein, includes a control module, hardware-or software, that implements a state transition table. Spreadsheet data base, as used herein, includes an array of one, two, three, or more dimensions that has information accessed using an index.

The database is, in the preferred embodiment, two-dimensional. Each state of the system is represented by one line (preferably a row) in the database. Line of a spreadsheet, as used herein, includes a set of data in a multi-dimensional array, wherein the set is identified by a common index for one of the dimensions. Perpendicular lines, such as columns, are used to provide operating parameters (such as current, voltage, wire feed speed, etc.), and to indicate what inputs result in a state change, and what the subsequent state will be. The following table shows a simple state transition table for a system with four states (peak, background, restrike, and restrike return) and three events that can result in a change of state (timeout, short detect and arc detect):

| STATE (Phase) | Timeout    | Short Detect | Arc Detect      |
|---------------|------------|--------------|-----------------|
| Peak          | Background | Restrike     | Peak            |
| Background    | Peak       | Restrike     | Background      |
| Restrike      | Restrike   | Restrike     | Restrike Return |
| Restrike Retn | Peak       | Restrike     | Restrike Return |

Each row indicates a state and each column indicates an event or condition that can end a state. The intersection of a row and column indicate the next state. Given the above table, if the system is in the peak portion of the waveform, the "peak" row is used to determine the next state. If the event that triggers the system to end the current state is a timeout, then the "timeout" column is used. Where the selected row and column intersect, the next state is given. Thus, in this case if the system times out while in the peak state it next goes to the background state. Similarly, if the system is in the background state and a short is detected the next state is restrike.

Another state may be added by simply adding an additional row to the table. Likewise, another state-changing condition can be added by adding another column to the table. The subsequent state can be changed by simply changing the entry in a given cell. The data in the cells that give the next state is called addressing data, because it indicates the index (the row) of the next state. Addressing data, as used herein, includes data directed to an index, location or other specifier of an array or memory.

Additional columns or rows can be provided to give parameter data for a given state—for example the magnitude of current or voltage, and the wire feed speed columns could be added. Parameter data, as used herein, includes data that sets operating points for a device (such as current magnitude, wire feed speed, etc.). Alternatively, the parameter data could be added in a third dimension to the array. Parameter data could also be given in additional rows or columns for thresholds (the voltage that determines if a short or arc is detected, e.g.).

The example above was given using a column and row arrangement, but the state-transition information could simply be memory accessed using an index (with a number of dimensions corresponding to the number of dimensions of a table).

Using a state table it is relatively easy to provide control of the weld output with shorter duration intervals by merely adding additional states or providing additional state-ending events. The states in the table above have a resolution in the 50–100 microsecond range, and are called phases.

The present invention also contemplates a state-based control over a longer time-frame, such as between different stages of the welding process including Preflow, Start Power, Weld Ramp, Weld1, Weld2, Crater Ramp, Crater, and Postflow. These stages are controlled on the order of 1 millisecond increments, and are called welding sequences. The invention contemplates a state-based control of one or both of phases and sequences.

In either case the output is characterized as a series of smaller segments. The waveform may have phases described by, for example, a leading ramp, an amplitude, and a timeout time. By stringing a number of phases together a multitude of waveforms can be created. The ramp can be further defined with a number of different shapes and rates. The amplitude can be any level. The time is marked from the beginning of the phase. The values for the ramp, amplitude, and time of each phase can be held by a database of numbers. Thus, virtually any waveform can be described, and a state-based control may be used.

Figure 1:
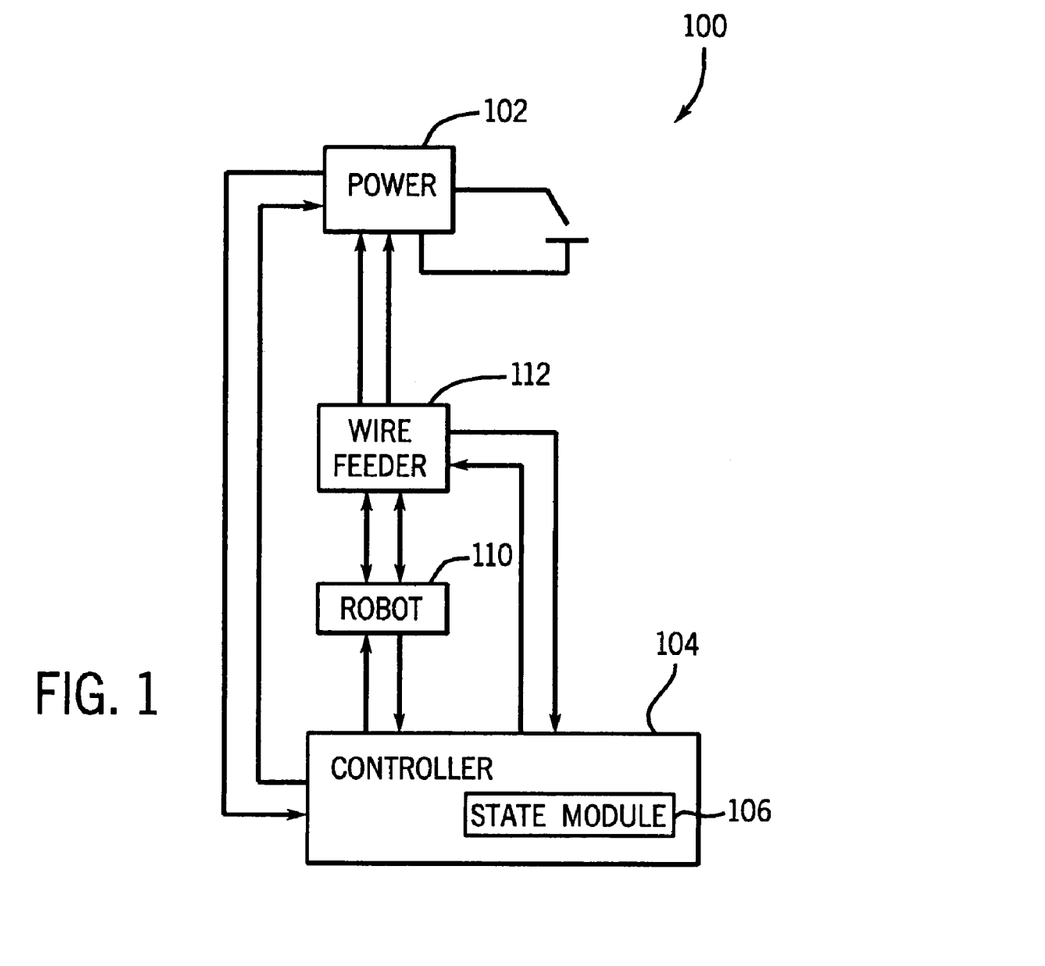
FIG. 1 is diagram of a welding-type power supply in accordance with the present invention.
Figure 2A:
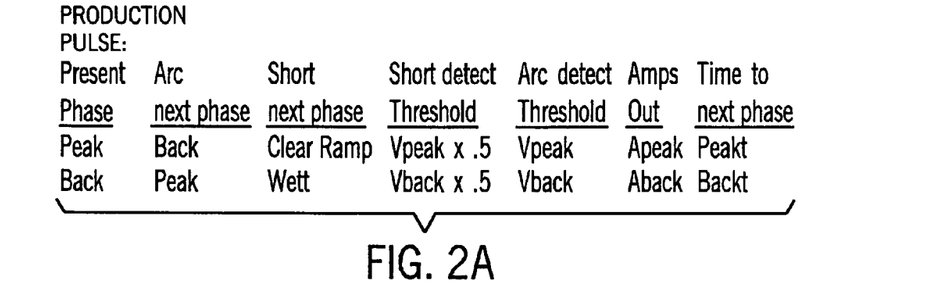
FIG. 2 is state-transition table in accordance with the present invention.
Figure 2B:
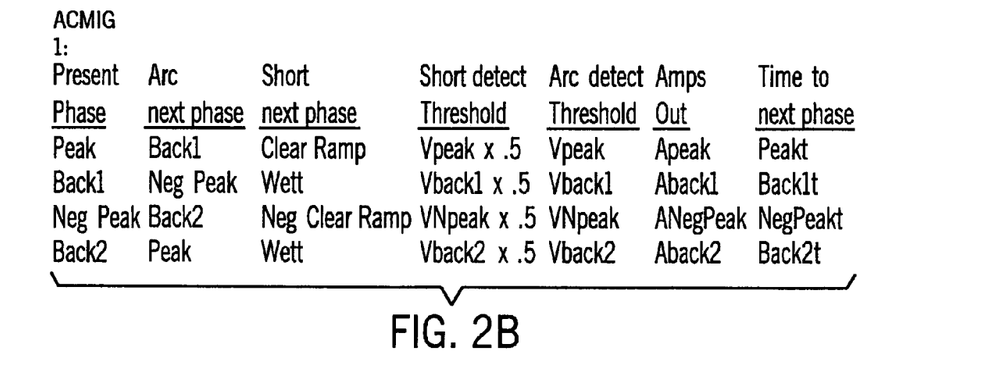
Figure 2C:
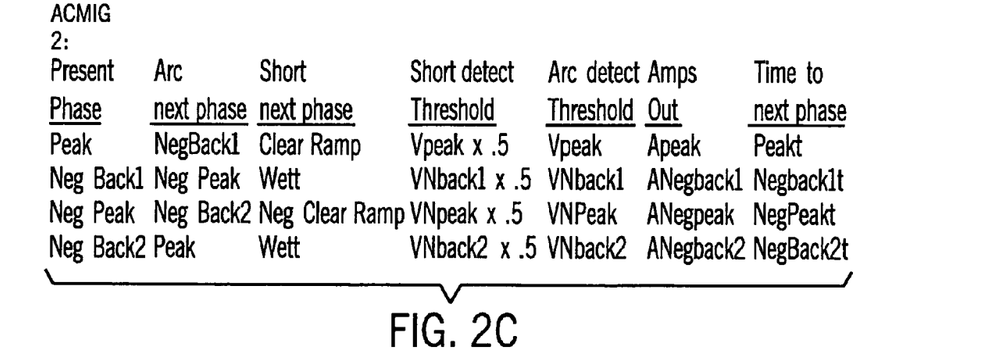
Figure 2D:
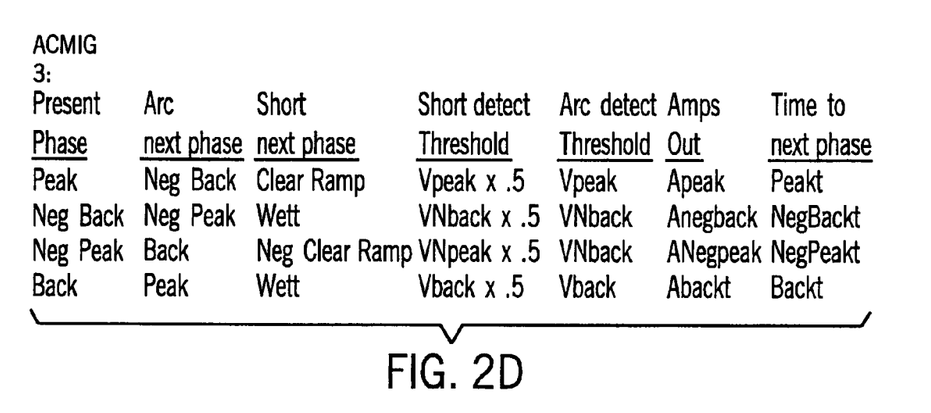
Figure 2E:
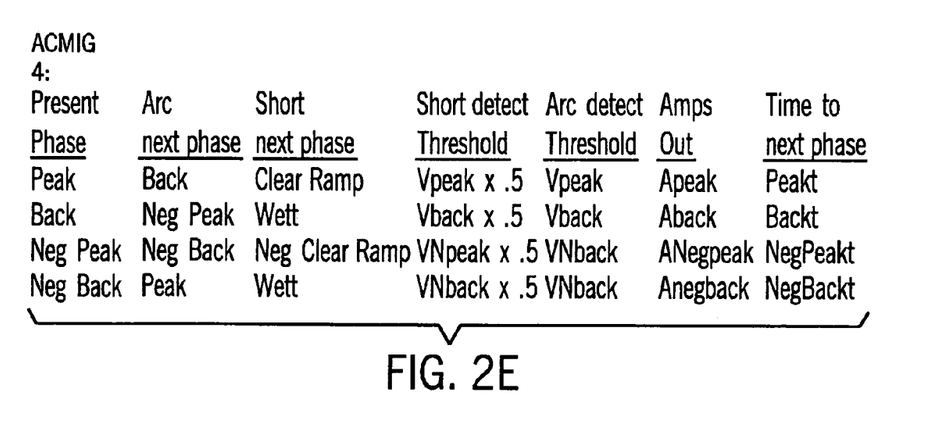

Referring now to FIG. 1, a welding-type power supply 100 having a state-based control is shown. System 100 includes a source of welding-type power 102, a wire feeder 112, a robot 110 and a controller 104. Controller 104 includes a state-based control module 106. The components cooperate to provide a welding-type output. Welding-type system, as used herein, includes welders, plasma cutters and induction heaters. Source of welding-type power, as used herein, is the power circuitry and associated circuitry that produce welding-type power when power is applied thereto.

Welding-type power, as used herein, includes power suitable welding, cutting and/or heating.

Power source 102 may be any power source, and examples include the power supplies found in the Miller Alt304® or Miller MaxStar® welding systems, also described in U.S. patent application Ser. No. 09/540,567, filed Mar. 31, 2000, entitled Method And Apparatus For Receiving A Universal Input Voltage In A Welding, Plasma Or Heating Power Source, and one described in U.S. Pat. No. 6,115,273, entitled Power Converter With Low Loss Switching, issued Sep. 5, 2000, which is hereby incorporated by reference.

Wire feeder 112 and robot 110 may be any commercially available welding peripheral. Welding peripheral, as used herein, includes wire feeders, robots, or any other device that can be part of a welding-type system.

Controller 104 and state-based control module 106 are preferably microprocessor based, and include flash or other non-volatile memory. Controller 104 is operatively connected to and communicates control signals, and receives feedback from, the other components. The communication may be of any form, but a network with a standard protocol, such as DeviceNet, is preferred. Operatively connected, as used herein, includes control connections, power connections, and/or analog connections, that may be hardware (wired or wireless) or software, by instructions.

An example of a spreadsheet having a state-transition table that may be used with system 100 is shown in FIG. 2. Five programs, Production Pulse and ACMIG1–4 are shown. The output can be a short or an arc, and the next phase for each is shown in columns 2 and three for each of the four segments or phases of the waveform. Columns 4–7 provide information what constitutes an arc detect, short detect, or timeout.

Figure 3A:
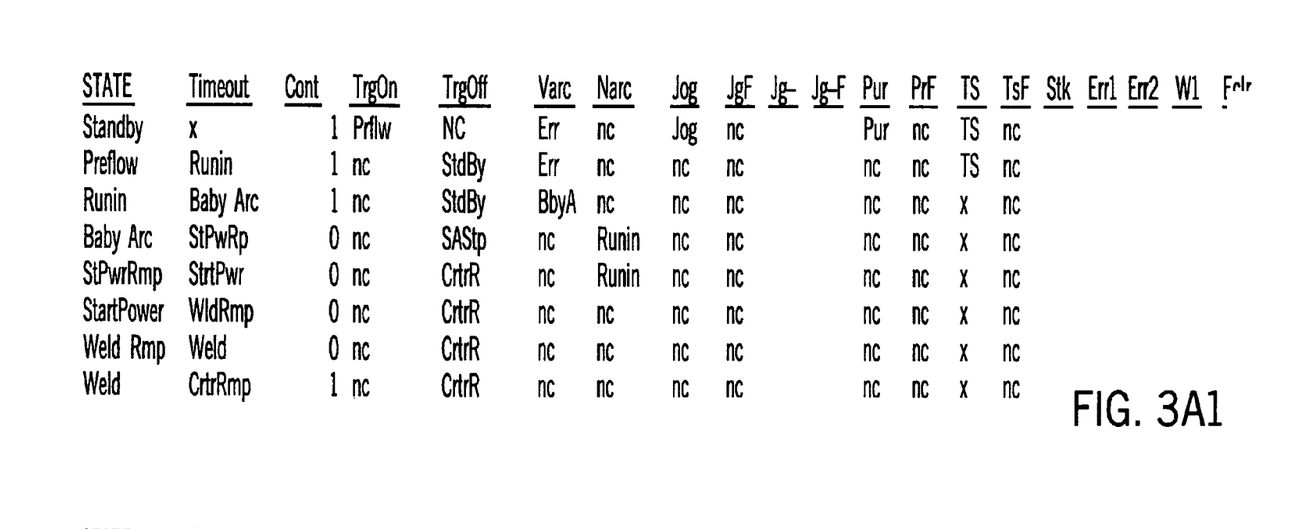
FIGS. 3A and 3B are a state-transition table in accordance with the present invention.
Figure 3A:
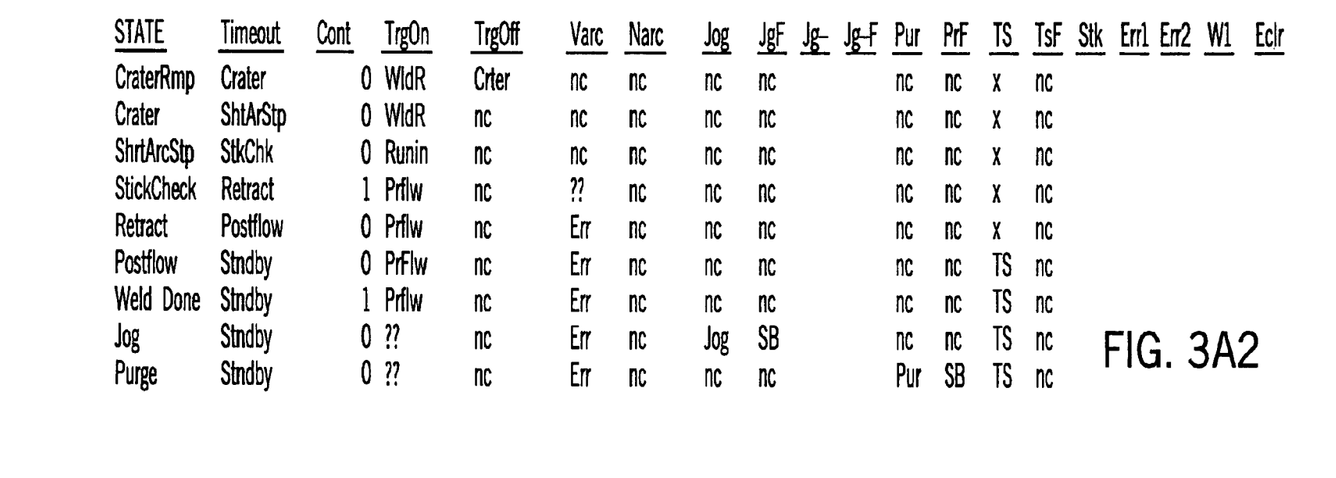
Figure 3A:
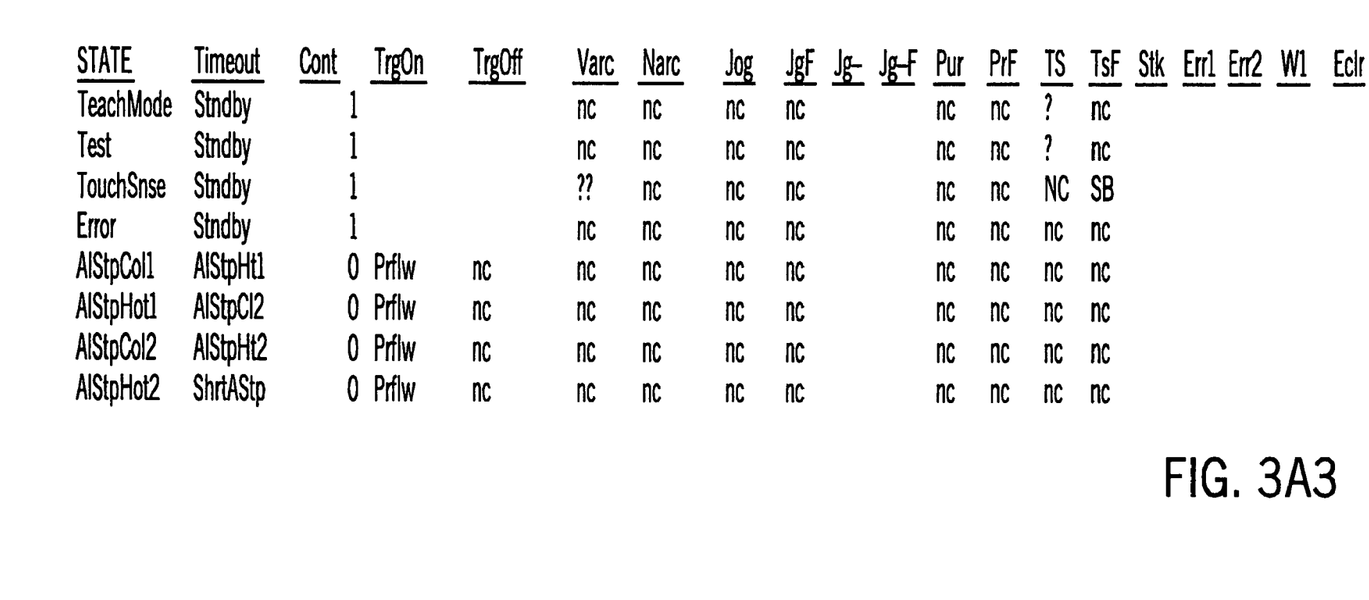
Figure 3B:
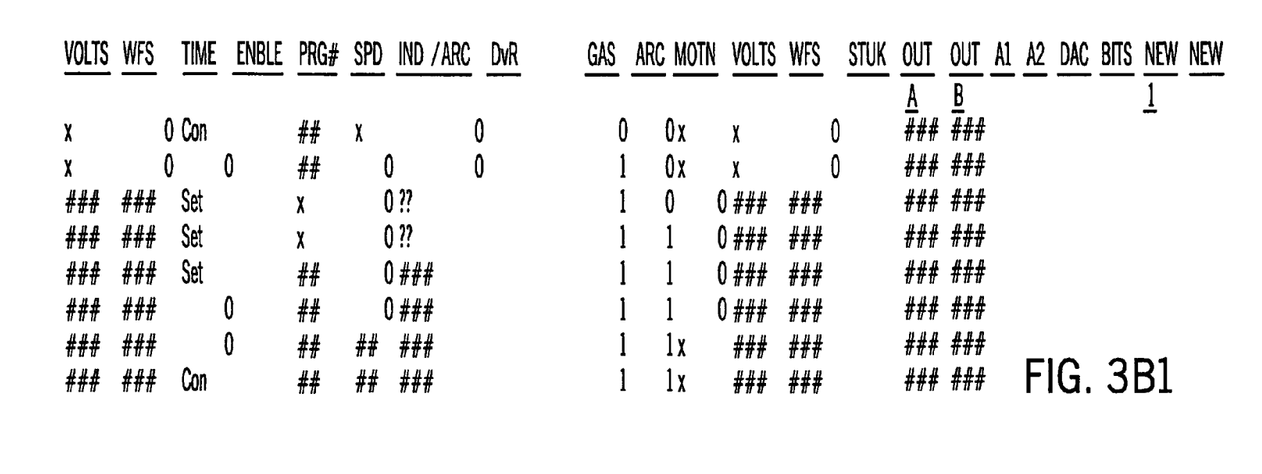
Figure 3B:
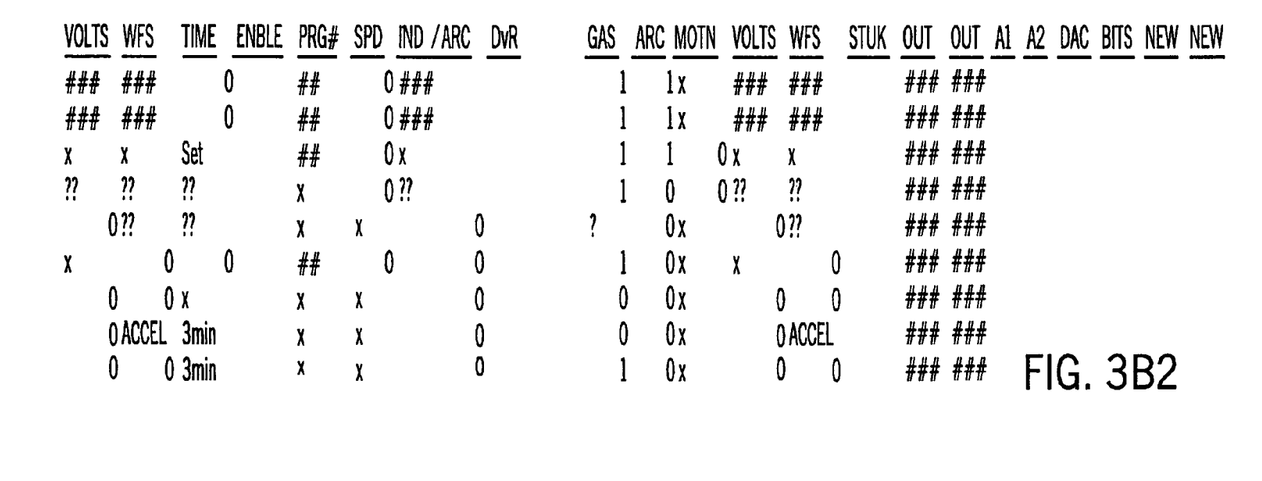
Figure 3B:
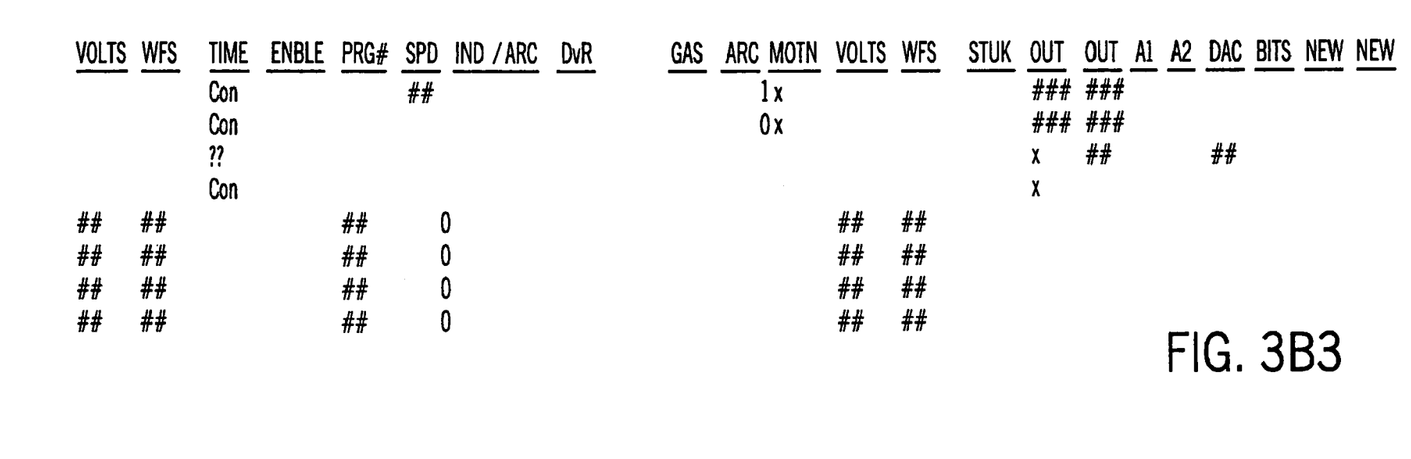

FIGS. 3A and 3B show a state-transition table for a sequence used with the system of FIG. 1. FIG. 3B is additional columns for use with the columns of FIG. 3A. The following table explains the abbreviations used in FIGS. 3A and 3B.

| | | |
|---|---|---|
| Timeout | Timeout | What State should you go to when the time of the present state expires. |
| Trig On | Trig on | What State should you go to when the trigger is on. |
| Trig Off | Trig off | What State should you go to when the trigger is off. |
| Jog | Jog | What State should you go to when Jog is requested. |
| Pur | Purge | What State should you go to when Purge is requested. |
| ALG1 | Analog1(V) | 0 = ignore analog input and use canned values; 1 = follow the 1–10 V input for voltage/Trim setting. |
| ALG2 | Analog1 (WFS) | 0 = ignore analog input and use canned values; 1 = follow the 1–10 V input for WFS setting. |
| TS | Touch Sense | TS = input from robot is allowed and if it is active, go to Touch Sense State(& do nothing but wait); x = input is ignored |
| Err1 | Error1 | Highest priority error 1 = shut down now !!!!! |
| Err2 | Error2 | Second level error. 1 = do a controlled stop/ Dry run can continue |
| W1 | Warning | Lowest level error. 1 = alert operator of condition but continue to weld as normal/Dry run continues. |
| Eclr | Error Clear | Operator acknowledged the error. Allow another weld or further info to operator. |
| Time | Preset Time | Preset time for timeout of each state. 0 = skip state (except for WELD1 0 = stay in state as long as TRIG is active) |

-continued

| | | |
|---|---|---|
| Volts | Preset Volt | Preset Voltage command for each state. If ANALOG1 = 1 ignore Preset Volts and follow the analog value. |
| WFS | Preset WFS | Preset Wire Feed Speed command for each state; If ANALOG2 = 1, ignore Preset & follow the analog input. |
| Ind/Arc | Induct/ ARC | Preset Inductance/Arc Control command for each state. |
| Prg# | Preset Prog # | Preset Program Number (1–8 of the active progs). Ignore, if the RPS is active |
| GAS | Gas Valve | 0 = OFF 1 = ON |
| Arc | Arc State Out | An output telling if each state is an arc state or not = MAY NOT BE USED. |
| Motn | Motion | An output telling if motion is allowed during each state. |
| OutA | Prog Out A | Programmable output #1 is active for 1 and 0 = off. |
| OutB | Prog Out B | Programmable output #2 is active for 1 and 0 = off. |
| DAC | Diagnostic | DAC value is used for each state to help determine where the code is. |
| Bits | Diagnostic | 16 bit port used for diagnostic flags in the software |

The state tables given are merely exemplary, and other states or data could readily be stored therein.

During a welding process it is possible to have whisker shorts—a very brief short circuit. This often occurs during the background phase (but may occur at other times also). The control scheme interprets the beginning of the short as the end of the background phase, and then proceeds to the next state. A whisker short quickly ends, and the control scheme interprets that event as the end of the short phase, and proceeds to the next state (ramp e.g.). However, often it is desirable to return to the background phase (as if the whisker short had never happened). Thus, when the whisker short ends, the desired next state is deterministic—not only does the event that ended it matter (the whisker short clearing), but other parameters including the duration of the current state (the whisker short), and the duration of the previous state (background). Other subsequent states may be deterministic as well, and the loop may jump to a phase other than the previous state.

One alternative provides for a deterministic control. In addition to using the column in the array, other parameters determine the next state. Deterministic control, as used herein, includes selecting the subsequent phase based on the current phase, the phase ending event, and other factors, including duration in the current or previous phase. Deterministic control module, as used herein, includes a control module implementing a deterministic control.

Numerous modifications may be made to the present invention which still fall within the intended scope hereof. Thus, it should be apparent that there has been provided in accordance with the present invention a method and apparatus for a welding-type system with a state-based controller that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A welding-type system comprising:
   a source of welding-type power; and
   a controller, having a controller output operatively connected to the source;
   wherein the controller includes a state-based control module defining at least two states having a plurality of subsequent states, connected to the controller output, wherein the state-based control module includes a state transition table stored in a spreadsheet data base, and further wherein a subsequent state and a current state are represented by data from the spreadsheet.

2. The apparatus of claim 1, wherein the state-based control module includes software instructions and a digital processor.

3. The apparatus of claim 2, further comprising a feedback circuit connected to the source and the controller, wherein the state-based control module is responsive to the feedback circuit.

4. The apparatus of claim 3, further comprising a welding peripheral operatively connected to the controller output.

5. The apparatus of claim 4, wherein the peripheral is a wire feeder.

6. The apparatus of claim 5, further comprising a second welding peripheral operatively connected to the controller output.

7. The apparatus of claim 6, wherein the second peripheral is a robot.

8. The apparatus of claim 4, wherein the peripheral is a robot.

9. The apparatus of claim 1, wherein:
   the current state is represented by data in a first line of the spreadsheet;
   a state-ending event is indicated by a second line of the spreadsheet;
   wherein the first line is perpendicular to the second line; and
   the subsequent state is determined by the intersection of the first and second lines.

10. The apparatus of claim 1, wherein the data includes addressing data and parameter data.

11. A welding-type system comprising:
    means for providing welding-type power; and
       means for state-based controlling the system wherein at least two states having a plurality of subsequent states, operatively connected to the means for providing;
       wherein the means for state-based controlling includes means for storing a state transition table in a spreadsheet data base.

12. The apparatus of claim 11, wherein the means for state-based controlling includes means for executing software instructions.

13. The apparatus of claim 12, further comprising means for providing feedback, connected to the means for providing and the means for state-based controlling, wherein the means for state-based controlling is responsive to the feedback circuit.

14. The apparatus of claim 13, further comprising a welding peripheral operatively connected to the means for state-based controlling.

15. The apparatus of claim 14, further comprising a second welding peripheral operatively connected to the means for state-based controlling.

* * * * *